US012667116B2

(12) United States Patent
Murray

(10) Patent No.: US 12,667,116 B2
(45) Date of Patent: Jun. 30, 2026

(54) METHODS OF COVERING FROZEN FOOD PRODUCTS IN CHOCOLATE

(71) Applicant: Tru Fru, LLC, Salt Lake City, UT (US)

(72) Inventor: Taz Murray, Salt Lake City, UT (US)

(73) Assignee: Tru Fru, LLC, Salt Lake City, UT (US)

( * ) Notice: Subject to any disclaimer, the term of this patent is extended or adjusted under 35 U.S.C. 154(b) by 1270 days.

(21) Appl. No.: 17/393,222

(22) Filed: Aug. 3, 2021

(65) Prior Publication Data

US 2022/0095643 A1　　Mar. 31, 2022

Related U.S. Application Data

(63) Continuation-in-part of application No. 17/356,847, filed on Jun. 24, 2021, now abandoned.

(60) Provisional application No. 63/085,832, filed on Sep. 30, 2020.

(51) Int. Cl.
| | |
|---|---|
| *A23G 3/34* | (2006.01) |
| *A23G 1/54* | (2006.01) |
| *A23G 3/48* | (2006.01) |
| *A23G 3/54* | (2006.01) |
| *A23G 9/42* | (2006.01) |
| *A23G 9/48* | (2006.01) |

(52) U.S. Cl.
CPC ............. *A23G 3/0091* (2013.01); *A23G 1/54* (2013.01); *A23G 3/343* (2013.01); *A23G 3/48* (2013.01); *A23G 3/54* (2013.01); *A23G 9/42* (2013.01); *A23G 9/48* (2013.01); *A23G 2220/20* (2013.01)

(58) Field of Classification Search
CPC ........ A23G 3/0091; A23G 1/54; A23G 3/343;
A23G 3/48; A23G 3/54; A23G 9/42;
A23G 9/48; A23G 2220/20; A23G 1/48;
A23G 3/0065; A23L 19/05
See application file for complete search history.

(56) References Cited

U.S. PATENT DOCUMENTS

| | | | |
|---|---|---|---|
| 2017/0290359 A1* | 10/2017 | Nachman | ............... A23B 2/805 |
| 2022/0095641 A1 | 3/2022 | Murray | |
| 2022/0386677 A1 | 12/2022 | Murray | |

FOREIGN PATENT DOCUMENTS

| | | | | |
|---|---|---|---|---|
| AR | 094385 A1 | | 7/2015 | |
| JP | 2014103959 A | * | 6/2014 | |
| WO | WO-2016001099 A1 | * | 1/2016 | ............. A23G 9/322 |

OTHER PUBLICATIONS

"Safe Food Storage" https://web.archive.org/web/20170203015101/https://www.canada.ca/en/health-canada/services/general-food-safety-tips/safe-food-storage.html Feb. 3, 2017 (Year: 2017).*

"Frozen Chocolate Dipped Pineapple Pops with Toasted Coconut" https://web.archive.org/web/20180814052638/https://www.kudoskitchenbyrenee.com/frozen-chocolate-dipped-pineapple-pops/ Apr. 25, 2014 (Year: 2014).*

(Continued)

*Primary Examiner* — Katherine D Leblanc

(74) *Attorney, Agent, or Firm* — Morrison & Foerster LLP

(57) ABSTRACT

A method of applying a thin layer of a chocolate coating onto a frozen food product, in some instances a piece of pineapple, that is at temperatures below 0° C. in such a way that prevents discoloration and brittleness of the applied chocolate. In some instances, the chocolate coating is a white chocolate, and coconut inclusions and flavoring are incorporated directly into the chocolate coating.

18 Claims, 5 Drawing Sheets

(56) References Cited

OTHER PUBLICATIONS

"High Fat Desiccated Coconut-Medium Grade" https://
indopacificcoconut.com/high-fat-desiccated-coconut-medium-grade/
1547890394411-26946f8a-0e20 2019 (Year: 2019).*

"White Chocolate Dipped Pineapple with Sprinkles" https://www.
acharmingproject.com/blog/2016/6/15/diy-white-chocolate-dipped-
pineapple-with-sprinkles Jun. 15, 2016 (Year: 2016).*

"How to Make White Chocolate" Alpha Foodie https://web.archive.
org/web/20200623192406/https://www.alphafoodie.com/how-to-
make-white-chocolate/ Jun. 19, 2020 (Year: 2020).*

Bauman English abstract EP1249487 Oct. 16, 2002 (Year: 2002).*

Jessica, (Mar. 11, 2011). "Homemade White Chocolate Peanut
Butter," available online at <https://www.howsweeteats.com/2011/
03/homemade-white-chocolate-peanut-butter/>, 24 pages.

Jessica, (May 16, 2014). "Chocolate Covered Raspberries," avail-
able online at <https://butterwithasideofbread.com/chocolate-covered-
raspberries/>, 16 pages.

The Hint of Rosemary, (Jul. 1, 2020). "Chocolate Peanut Butter
Frozen Bananas On A Stick," available online at <https://
thehintofrosemary.com/frozen-chocolate-covered-bananas-with-
peanut-butter/>, modified Jun. 23, 2024, 39 pages.

Unpublished U.S. Appl. No. 19/048,778, filed Feb. 7, 2025 titled.
"Methods of Processing Peanut Butter Covered Frozen Food Prod-
ucts," (not submitted herewith pursuant to the waiver of 37 C.F.R.
§ 1.98(a)(2)(iii)).

* cited by examiner

26

30

54

20

22

METHODS OF COVERING FROZEN FOOD PRODUCTS IN CHOCOLATE

BACKGROUND OF THE INVENTION

1. Field of the Invention

The present disclosure generally relates to methods of processing chocolate covered frozen food products. More specifically, the present disclosure relates to covering frozen food products in a chocolate that includes coconut inclusions.

2. Background and Related Art

Many people enjoy chocolate and chocolate covered confections.

BRIEF SUMMARY OF THE INVENTION

The present invention relates to improved methods for completely enrobing a frozen food product in an untempered, pure cocoa butter chocolate. More specifically, the present invention relates to completely enrobing a frozen food product, such as a piece of frozen pineapple, in a pure, cocoa butter chocolate coating that may include white chocolate, coconut inclusions, and flavoring. The invention also relates to the ability to envelop the frozen food product in at least a thin layer of the chocolate coating and then rapidly chill and freeze the chocolate covered frozen food product in such a way that prevents the chocolate from becoming cloudy or frangible.

In some embodiments, a frozen food product includes a frozen fruit. For example, in some embodiments, the frozen fruit includes a piece of frozen pineapple, a slice of banana, a raspberry, a blueberry, a strawberry, a cherry, or any other suitable bite-size fruit or piece of fruit.

In some embodiments, an enrobing chocolate comprises a pure cocoa butter chocolate with additional cocoa butter, resulting in a pure, high cocoa content chocolate. In some embodiments, the pure, high cocoa content chocolate further includes coconut inclusions. In some embodiments, the pure, high cocoa content chocolate further includes flavoring comprising coconut flavored seed oil. In some embodiments, the coconut inclusions comprise desiccated, unsulfated coconut. In some embodiments, the coconut is a medium gem size.

In some embodiments, the frozen food product, such as a piece of frozen pineapple, is received for processing, including whole pieces and partial pieces. Accordingly, in some embodiments, a first step in the process includes sorting the frozen food product. Sorting removes any pieces of the frozen food product that are too small to process and distributes the frozen food product along a conveyer belt creating space between the individual pieces. In some embodiments, a next step includes enrobing the frozen food product to completely coat it in a thin layer of the chocolate coating, creating an enrobed frozen food product. In some embodiments, the chocolate coating includes white chocolate with coconut inclusions and flavoring. In some embodiments, a next step includes conveying the enrobed frozen food product along a shaking belt and through high-velocity blowers to remove all chocolate coating in excess of a thin layer. In some embodiments, the enrobed frozen food product is then conveyed along a cooling belt to harden a bottom surface of the chocolate coating that is in contact with the cooling belt. Because the chocolate is untempered, the enrobed frozen food product is immediately cooled and frozen. In some embodiments, it is then packaged in a refrigerated environment to prevent condensation from forming on the enrobed frozen food product.

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims or may be learned by the practice of the invention as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail using the accompanying drawings in which:

DETAILED DESCRIPTION OF THE INVENTION

Figures 1, 2:
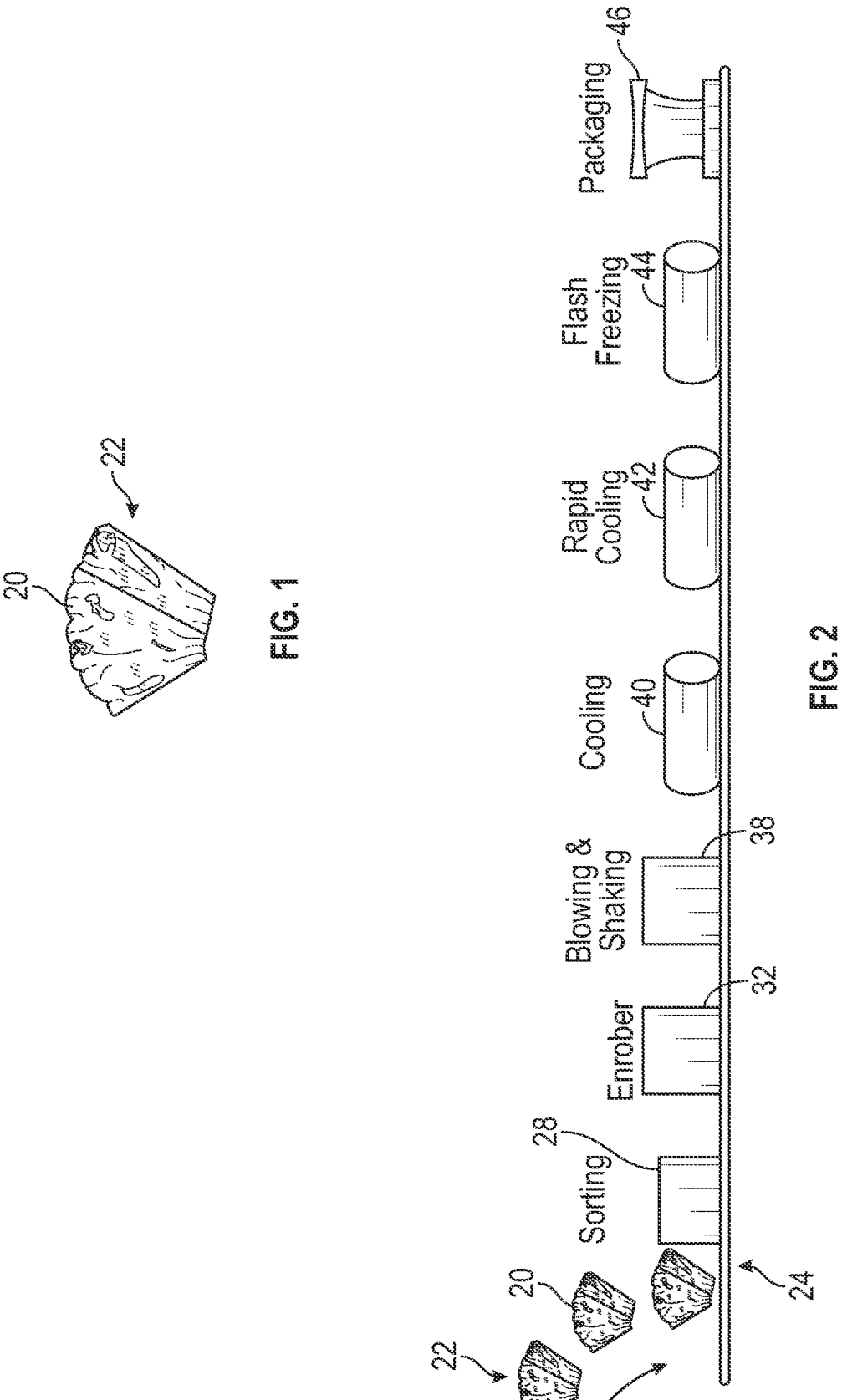
FIG. 1 shows an elevation view of a piece of frozen pineapple or other frozen food product.
FIG. 2 shows a flow diagram comprising an overview of the steps of the present invention.

The term "food product" refers to all substances that are usually composed of carbohydrates, fats, proteins, or water and can be eaten or drunk by any animal, including humans, for nutrition or pleasure, energy, or building tissue.

The terms "brittleness" and "frangible" refer to a chocolate coating that is easily broken, cracked, or snapped.

The terms "discoloration" and "clouding" refer to a chocolate coating that exhibits a hazy surface appearance.

The present invention relates to improved methods for completely enrobing a frozen food product in an untempered, pure cocoa butter chocolate. More specifically, the present invention relates to completely enrobing a frozen food product, such as a piece of frozen pineapple, in a pure, cocoa butter chocolate coating that may include white chocolate, coconut inclusions, and flavoring. The invention also relates to the ability to envelop the frozen food product in at least a thin layer of the chocolate coating and then rapidly chill and freeze the chocolate covered frozen food product in such a way that prevents the chocolate from becoming cloudy or frangible.

Many people enjoy chocolate covered confections. Conventional methods for coating chocolate covered confections include enrobing a confection with a tempered, high viscosity robing chocolate. Conventional robing chocolate commonly includes supplemental agents, such as coconut oil or butter, to decrease the melting point of the chocolate, thereby creating a "compound coating." Chocolate with a low melting point enables a sensation referred to as "meltaway" wherein the chocolate begins to melt immediately when placed in a consumer's mouth. Additionally, compound coatings create a softer chocolate that is more pleasing to bite into when frozen. When enrobing a frozen food product with typical compound coatings, the high viscosity robing chocolate tends to adhere rapidly to the frozen food product creating an undesirable, thick layer of chocolate. Lastly, one skilled in the art will appreciate that by conventional methods, processing chocolate typically requires tempering the chocolate to achieve an evenly colored coating.

Using the present invention, it is possible to enrobe a frozen food product with an untempered, low viscosity, pure cocoa butter chocolate to achieve at least a thin, evenly colored layer of the chocolate coating. It is incredibly unique in the confection industry to coat any frozen product. This is due, at least in part, to undesirable condensation that can form on the frozen product making it difficult for any coating to adhere to the frozen product and increasing the risk of adding undesirable moisture to the enrobing process. It is as inventive to do so using a pure cocoa butter chocolate applied in a thin layer. The special blend of pure cocoa butter chocolate decreases the melting point of the chocolate to achieve the meltaway sensation without including any supplemental agents. The thin layer of chocolate allows a consumer to bite into the frozen product effortlessly. In addition, processing the chocolate coating and frozen food product in a humidity-controlled environment mitigates the risk of adding undesirable moisture, or water, into the chocolate coating. When pure chocolate mixes with water, the chocolate tends to seize, causing an undesirable grainy texture and increasing its viscosity. Finally, processing untempered chocolate allows the enrobed frozen food product to be rapidly cooled and flash frozen immediately after enrobing, thereby eliminating the need to cool a tempered chocolate slowly.

In some embodiments the pure, cocoa butter chocolate includes white chocolate, coconut inclusions, and flavoring. In some embodiments, the coconut inclusions comprise a desiccated, unsulfated, medium gem coconut. The specific size and other characteristics of desiccated, unsulfated, medium gem coconut make it desirable because it creates the mouthfeel of a real coconut. In some embodiments, the flavoring comprises coconut flavored seed oil. Importantly, in some embodiments the flavoring is incorporated into the chocolate itself and not into the frozen food product or the coconut inclusions. The flavoring is oil-based instead of water-based so that it can be incorporated directly into the chocolate coating without causing the chocolate to emulsify.

A description of embodiments of the present invention will now be given with reference to the Figures. It is expected that the present invention may take many other forms and shapes. Hence the following disclosure is intended to be illustrative and not limiting, and the scope of the invention should be determined by reference to the appended claims.

Referring now to FIGS. 1-7.

FIG. 1 shows an elevation view of a piece of frozen pineapple 20 or other frozen food product 22. FIG. 2 shows a flow diagram comprising an overview of the steps of the present invention. Each step includes processing the frozen food product 22 along a conveying system 24 to create an enrobed frozen food product 26.

Those skilled in the art will appreciate that embodiments of the present invention embrace a variety of different configurations. For example, in some embodiments, a frozen food product 22 comprises a fruit. In some embodiments, the frozen food product 22 comprises a piece of frozen pineapple 20, a slice of banana, a raspberry, a blueberry, a strawberry, or a cherry, or any other suitable bite-size fruit or piece of fruit.

In some embodiments, a frozen food product 22 is received for processing, including whole pieces, partial pieces, slices, and chunks. Accordingly, in some embodiments, a first step in the process for preparing an enrobed frozen food product 26 includes sorting 28 the frozen food product 22 in such a way that discards pieces of the frozen food product 22 that are too small to process. In some embodiments, wherein the frozen food product 22 is a piece of frozen pineapple 20, it is desirable to process the frozen pineapple in bite-size pieces sometimes referred to as "tidbits." A pineapple tidbit can be similar to a pineapple chunk.

The frozen food product 22 is then transported along a conveying system 24. Each conveyor belt travels with increasing speed relative to the previous step to achieve a thin layer of the chocolate coating 30. The increasing speed of the conveyor system also serves to create separation between the frozen food products 22, and the enrobed frozen food products 26, throughout the process. One skilled in the art will appreciate that by conventional methods, each conveyor belt typically travels at a decreasing speed relative to the previous step positioning the confections closer together.

In some embodiments, a frozen food product 22 passes through an enrober 32 to achieve a thin layer of the chocolate coating 30, creating an enrobed frozen food product 26. In some embodiments, the enrober 32 can be cleaned-in-place in such a way that further mitigates the risk of adding undesirable moisture, or water, into the chocolate coating.

Next, the enrobed frozen food product 26 is conveyed along a shaking belt 34 through blowers 36 to remove all the chocolate coating 30 in excess of a thin layer; this step is referred to as "blowing and shaking" 38. The enrobed frozen food product 26 is then conveyed along a cooling belt 40, at a temperature between about 1.7° C. and about 7.2° C. Next, the enrobed frozen food product 26 is conveyed through a rapid cooling tunnel 42 at a temperature below 1.7° C., followed by flash freezing 44 in an Individual Quick Frozen ("IQF") unit at a temperature below −18° C. The IQF includes a perforated belt having high velocity, frozen air blowing up through the belt, and causing the enrobed frozen food product 26 to lift off the belt and separate from other enrobed frozen food products. The IQF is a standard machine in the industry; however, it is not typically used to process enrobed chocolate products. After flash freezing 44, the enrobed frozen food product 26 undergoes packaging 46. Packaging 46 takes place in a refrigerated environment, at a temperature below 4° C., as quickly as possible to prevent condensation from forming on the enrobed frozen food product 26. In some embodiments, the process is carried out in a humidity-controlled environment so that undesirable moisture, or water, is not incorporated into the chocolate coating 30.

Figure 3:
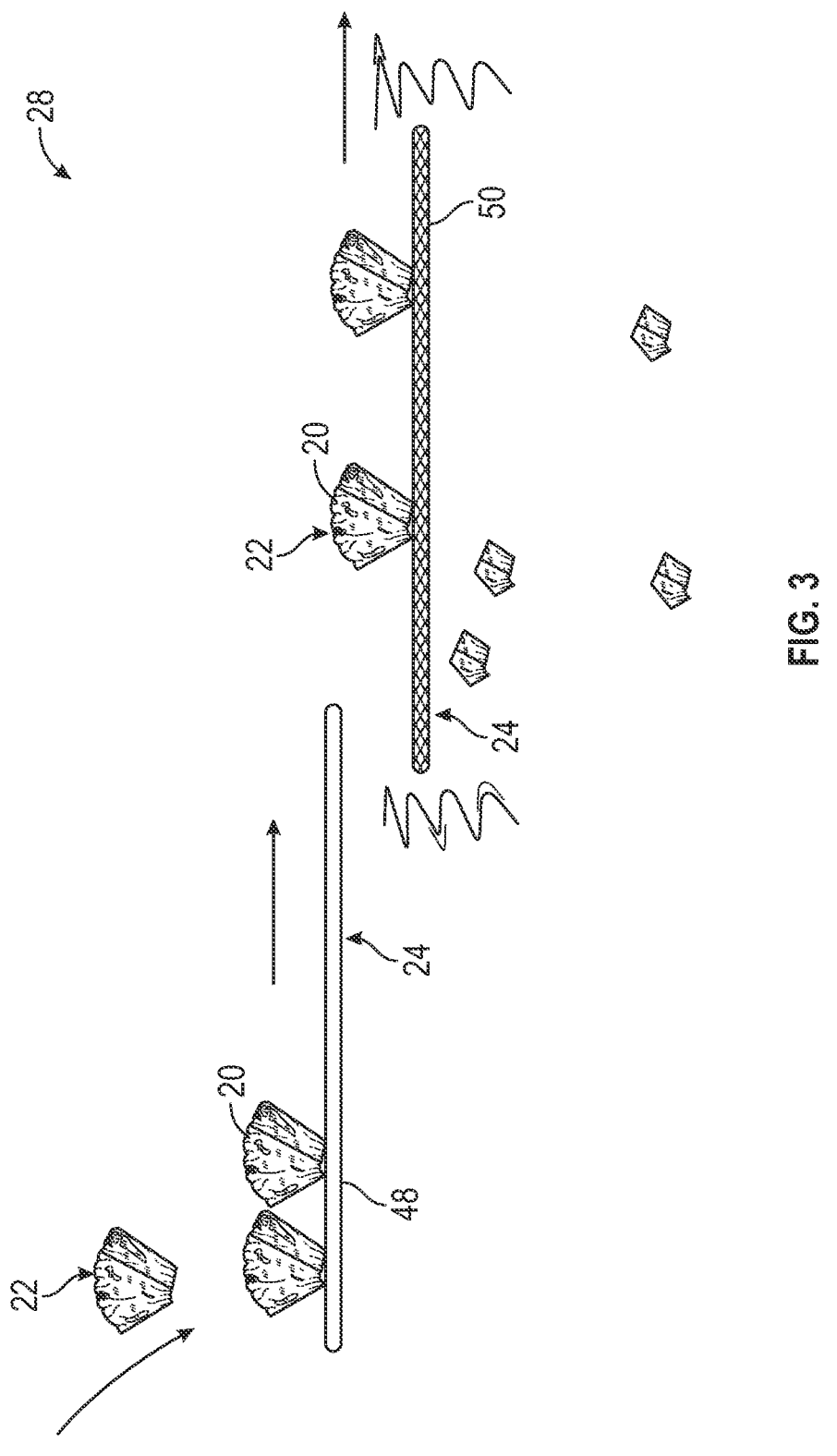
FIG. 3 shows a flow diagram of a sorting step.

FIG. 3 shows a flow diagram of a sorting step 28 wherein whole pieces and partial pieces of a frozen food product 22 are received, and those pieces of the frozen food product that are too small to be processed are discarded. The frozen food product 22 initially travels along an infeed belt 48 and onto a sorting belt 50. The infeed belt 48 and the sorting belt 50 form part of the conveying system 24. In some embodiments, the infeed belt 48 and the sorting belt 50 travel at a speed between about 0 meters per minute ("m/m") and about 15 m/m, and more commonly at a speed between about 4 m/m and about 10 m/m. In some embodiments, the sorting belt 50 includes wire mesh with large enough openings to allow small pieces of the frozen food product 22 to pass through the openings. Furthermore, in some embodiments, the sorting belt 50 vibrates to encourage the small pieces of the frozen food product 22 to pass through the openings, and the small pieces of the frozen food product 22 that fall through the sorting belt 50 are removed from the process. The sorting 28 step prevents small pieces of the frozen food product 22 from falling through an enrobing belt at a subsequent step in the process, thereby adding undesirable moisture to the chocolate coating 30 below. Furthermore, the sorting 28 step is performed in such a way that minimizes friction and motion on the surface of the frozen food product 22 to reduce or eliminate damage.

Figure 4:
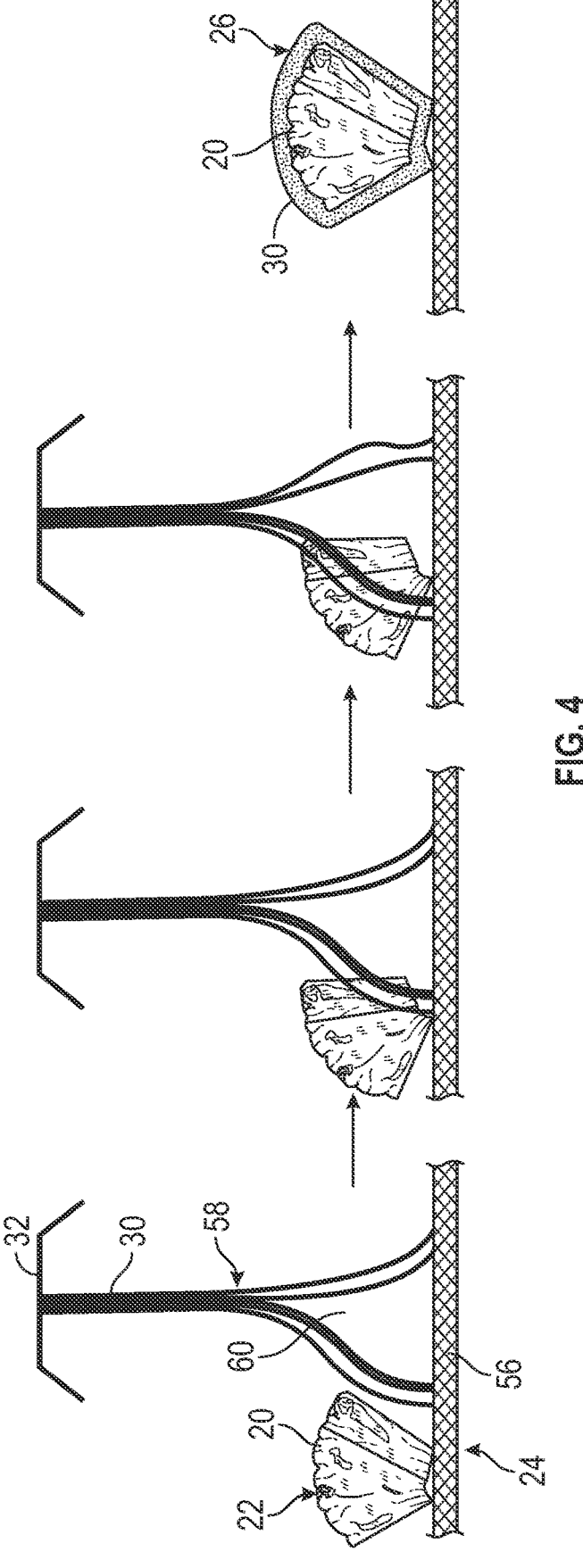
FIG. 4 shows a flow diagram of an enrobing step.

FIG. 4 shows a flow diagram of an enrobing step. In some embodiments, the chocolate coating 30 used to enrobe the frozen food product 22 comprises a pure cocoa butter chocolate with additional cocoa butter, resulting in a pure, high cocoa content chocolate. Increasing the amount of cocoa butter in chocolate decreases the melting point of the chocolate to achieve a low viscosity chocolate with a good flow characteristic. Because of the low melting point of the pure, high cocoa content chocolate, the chocolate begins to melt immediately when consumed, creating a sensation referred to in the industry as "meltaway." Using the pure, high cocoa content chocolate obviates the need for incorporating other agents into the chocolate, such as coconut oil and butter. Those skilled in the art will appreciate the incredible uniqueness of using a real chocolate, made from pure cocoa butter, to coat a frozen confection. In some embodiments, the pure, high cocoa content chocolate is untempered and processed at a temperature between about 37.8° C. and about 43.3° C. Using untempered chocolate allows rapid cooling and freezing of the enrobed frozen food product 26 as soon as the chocolate is applied.

Figure 5:
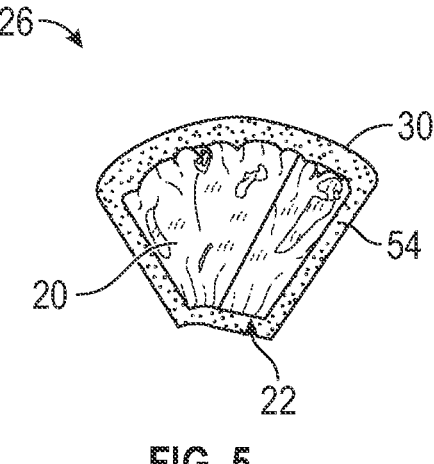
FIG. 5 shows a cross-sectional view of an enrobed piece of frozen pineapple or other frozen food product.

FIG. 5 shows a cross-sectional view of an enrobed piece of frozen pineapple 20 or other enrobed frozen food product 26 as it exits a the enrober 32, coated in a thin layer of the chocolate coating 30.

In some embodiments, the chocolate coating 30 comprises pure, high cocoa content chocolate that includes a pure, high cocoa content white chocolate with coconut inclusions 54 and flavoring. In some embodiments, the coconut inclusions 54 are solid coconut inclusions. In some embodiments, the coconut inclusions 54 may be present between about 0% and about 10% by weight of the chocolate coating 30. More commonly, the coconut inclusions 54 may be present at about 3% by weight of the chocolate coating 30. Those skilled in the art will appreciate that by conventional methods, enrobing pumps are typically unable to pump or process a chocolate coating that includes any addition of solids into the chocolate coating. However, the enrober 32 includes custom-made pumps that are equipped to process the chocolate coating 30 that includes solid, coconut inclusions 54.

In some embodiments, the coconut inclusions 54 comprise a desiccated, unsulfated, coconut. While desiccated, unsulfated, coconut is a standard product, it is not typically used as an inclusion in enrobed confections. Instead, conventional methods for incorporating coconut gems, or any other type of coconut, into confections typically include the use of undesiccated, sulfated coconut. This is because undesiccated, sulfated coconut has a longer shelf life than desiccated, unsulfated, coconut. However, the present invention provides the benefit of a long shelf life even when using desiccated, unsulfated coconut. This is because the coconut inclusions 54 are submerged or directly incorporated into the chocolate coating 30 and then quickly frozen, thereby providing a desirable and prolonged shelf life. In some embodiments, the coconut inclusions 54 comprise a medium gem coconut. The term "medium gem" denotes the size of the coconut inclusions 54. Medium gem coconut creates a desirable mouthfeel, like that of a real coconut, when the enrobed frozen food product 26 is consumed.

In some embodiments, the flavoring comprises a coconut-flavored seed oil. In some embodiments, the flavoring may be present between about 0.01% and about 0.6% by weight of the chocolate coating 30. More commonly, the flavoring may be present at about 0.3% by weight of the chocolate coating 30. Importantly, the flavoring may be incorporated directly into the chocolate coating 30 itself and not into the frozen food product 22 or the coconut inclusions 54. Using flavoring that is oil-based instead of water-based allows this direct incorporation into the chocolate coating 30 without causing the chocolate to emulsify.

The enrobing step includes conveying the frozen food product 22 along an enrobing belt 56 under a curtain 58 of the chocolate coating 30 in such a way that completely coats, or envelopes, the frozen food product 22 in the chocolate coating 30. The enrobing belt 56 forms part of the conveying system 24 and includes wire mesh to allow recovery of excess chocolate that drains through the enrobing belt 56 as the frozen food product 22 is enveloped. Those skilled in the art will appreciate that in some embodiments, the enrobing belt 56 travels at a speed between about 0 m/m and about 20 m/m, and more commonly at a speed between about 5 m/m and about 15 m/m. Typical enrobing belts in the industry travel at a speed of approximately 2 m/m. The enrober 32 includes custom-made pumps equipped to process the chocolate coating 30 comprising coconut inclusions 54. The pumps force the chocolate coating 30 to continuously flow downward over the enrobing belt 56 creating the free-falling curtain 58 of the chocolate coating 30.

Figure 6:
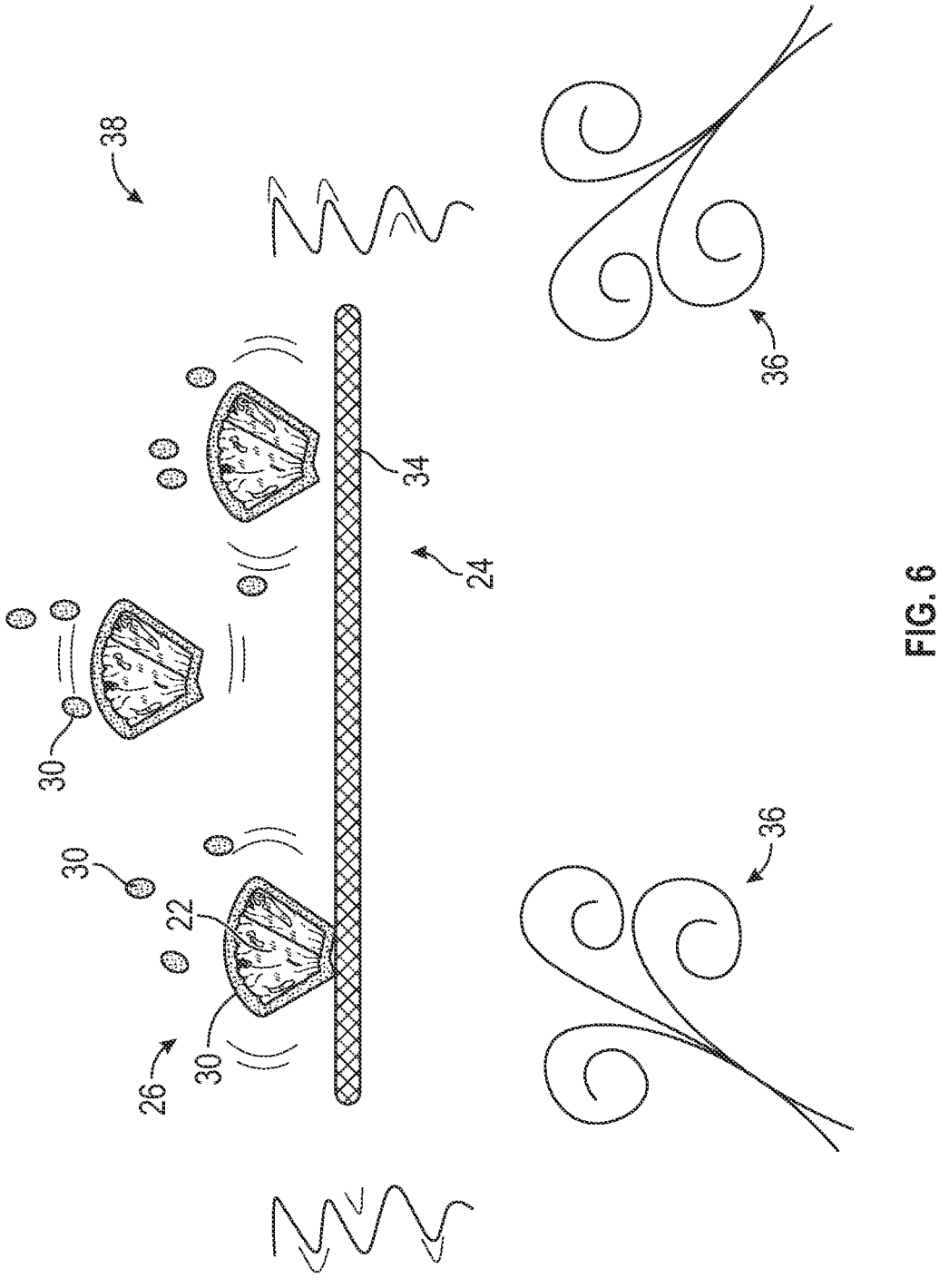
FIG. 6 shows an elevation view of a blowing and shaking step.

In some embodiments, a plate resides directly below the enrobing belt 56 referred to as a "bottomer." As the curtain 58 of the chocolate coating 30 cascades downward, it contacts the enrobing belt 56 and the bottomer creating a wave 60. As the frozen food product 22 travels under the curtain 58 of the chocolate coating 30, the wave 60 engulfs the frozen food product 22, thereby completely coating the frozen food product 22. Because of the low viscosity and good flow characteristic of the chocolate coating 30, the chocolate captures the entire surface of the frozen food product 22 filling any irregularities. The chocolate coating 30 begins to harden immediately upon contacting the frozen food product 22. As the frozen food product 22 exits the enrober 32, it emerges as an enrobed frozen food product 26 coated in a thin layer of the chocolate coating 30. FIG. 6 shows an elevation view of the blowing and shaking step 38.

In some embodiments, an enrobed frozen food product 26 is conveyed along an aggressively shaking belt 34 and through blowers 36 creating high-velocity air blowing up through the belt to remove all chocolate coating 30 in excess of a thin layer. In some embodiments, the aggressive motion of the shaking belt 34, combined with the forced air blowing up through the belt from the blowers 36, propels the enrobed frozen food product 26 into irregular motion—the irregular motion aids in removing any chocolate coating 30 in excess of a thin layer. The shaking belt 34 includes wire mesh with openings to allow excess chocolate coating 30 to fall through the openings. The shaking belt 34 forms part of a conveying system 24. In some embodiments, the thickness of the thin layer of chocolate coating 30 is between about 0 millimeters ("mm") and about 5 mm, and more commonly between about 1 mm and about 2 mm. In some embodiments, the excess chocolate coating 30 that falls through the openings in the shaking belt 34 is removed from the process. In some embodiments, the excess chocolate coating 30 that falls through the openings in the shaking belt 34 is recycled into the process.

In some embodiments, the enrobed frozen food product 22 is then conveyed along a cooling belt 40, at a temperature between about 0° C. and about 10° C., more commonly between about 1.7 C and about 7.2° C., thereby hardening the chocolate coating 30 on the bottom of the enrobed frozen food product 22. The cooling belt 40 forms part of a conveying system 24. In some embodiments, the cooling belt 40 travels at a speed between about 0 m/m and about 15 m/m, and more commonly at a speed between about 6 m/m and about 10 m/m.

In some embodiments, an enrobed frozen food product 26 is conveyed through a rapid cooling tunnel 42 and cooled to a temperature below 1.7° C. In some embodiments, the rapid cooling tunnel 42 includes a second cooling belt that forms part of a conveying system 24. In some embodiments, the second cooling belt travels at a speed between about 0 m/m and about 15 m/m, and more commonly at a speed between about 6 m/m and about 10 m/m.

In some embodiments, an enrobed frozen food product 26 then undergoes flash freezing 44 in an IQF unit to a temperature below −18° C. The IQF includes a perforated belt having high velocity, frozen air blowing up through the belt, and causing the enrobed frozen food product 26 to lift off the belt and separate from other enrobed frozen food products. The IQF is a standard machine in the industry; however, it is not typically used to process enrobed chocolate products. After flash freezing 44, the enrobed frozen food product 26 undergoes packaging 46. Packaging 46 takes place in a refrigerated environment, at a temperature below 4° C., as quickly as possible to prevent condensation from forming on the enrobed frozen food product 26.

The present invention creates a unique and improved process for completely enrobing a frozen food product in an untempered, pure cocoa butter chocolate. More specifically, the present invention relates to completely enrobing a frozen food product, such as a piece of frozen pineapple, in a pure, cocoa butter chocolate coating that may include white chocolate with coconut inclusions and flavoring. The invention also relates to the ability to envelop the frozen food product in at least a thin layer of the chocolate coating and then rapidly chill and freeze the chocolate covered frozen food product in such a way that prevents the chocolate from becoming cloudy or frangible.

The present invention may be embodied in other specific forms without departing from its spirit or essential characteristics. The described embodiments are to be considered in all respects, only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A process of applying an untempered chocolate coating onto pieces of a frozen food product to form a thin layer of the chocolate coating completely enrobing each piece of the frozen food product and prevent condensation from forming on the chocolate coating, the process comprising:
   obtaining pieces of the frozen food product;
   obtaining an untempered chocolate containing cocoa butter, a plurality of coconut inclusions, no more than about 0.6% coconut oil by weight, and no butter;
   applying a layer of the untempered chocolate by conveying the pieces of the frozen food product along an enrobing belt under a curtain of the untempered chocolate, wherein the untempered chocolate is maintained at a temperature between about 37.8° C. and about 43.3° C. and the enrobing belt travels at a speed of between about 5 m/m and about 15 m/m, to envelop each piece of the frozen food product in a chocolate coating thereby creating pieces of completely enrobed frozen food product;
   conveying the pieces of completely enrobed frozen food product along a vibrating perforated belt having pressurized air passing up through the belt to remove all the chocolate coating in excess of a thin layer between about 1 mm and about 2 mm thick of each piece;
   flash cooling the pieces of completely enrobed frozen food product to a temperature below 1.7° C.;
   freezing the pieces of completely enrobed frozen food product to a temperature below −18° C.; and
   rapidly packaging the pieces of completely enrobed frozen food product at a temperature between about 0° C. and about 10° C. to prevent condensation from forming on each piece of the completely enrobed frozen food product.

2. The process as recited in claim 1, wherein the frozen food product is a fruit.

3. The process as recited in claim 1, wherein the frozen food product is a piece of pineapple.

4. The process as recited in claim 1, wherein the chocolate coating comprises a white chocolate.

5. The process as recited in claim 1, wherein the plurality of coconut inclusions is a plurality of solid, desiccated, unsulfated, medium gem coconut inclusions.

6. The process as recited in claim 1, wherein the chocolate coating further comprises coconut flavored seed oil.

7. The process of claim 1, wherein the packaging of the pieces of completely enrobed frozen food product is performed at a temperature below 4° C.

8. The process as recited in claim 5, wherein the plurality of solid, desiccated, unsulfated, medium gem coconut inclusions is present in an amount between about 0% and about 6% by weight of the chocolate coating.

9. The process as recited in claim 5, wherein the plurality of solid, desiccated, unsulfated, medium gem coconut inclusions is present in an amount equal to about 3% by weight of the chocolate coating.

10. The process as recited in claim 6, wherein the coconut flavored seed oil is present in an amount between about 0.01% and about 0.6% by weight of the chocolate coating.

11. The process as recited in claim 6, wherein the coconut flavored seed oil is present in an amount equal to about 0.3% by weight of the chocolate coating.

12. The process as recited in claim 1, further comprising cooling the pieces of completely enrobed frozen food product to a temperature between about 1.7° C. and about 7.2° C. prior to flash cooling the pieces of completely enrobed frozen food product.

13. The process as recited in claim 12, wherein cooling the pieces of completely enrobed frozen food product to a temperature between about 1.7° C. and about 7.2° C. is achieved by conveying the pieces of completely enrobed frozen food product along a cooling belt, traveling at a speed between about 6 m/m and about 10 m/m, to harden the chocolate coating along a bottom surface of each piece of the completely enrobed frozen food product.

14. The process as recited in claim 1, wherein the flash cooling of the pieces of completely enrobed frozen food product to a temperature below 1.7° C. is achieved by conveying the pieces of enrobed frozen food product along a second cooling belt, traveling at a speed between about 6 m/m and about 10 m/m.

15. The process as recited in claim 1, further comprising:
providing pieces of frozen food product onto a sorting belt, wherein the sorting belt comprises wire mesh with openings that are large enough to allow small pieces of the frozen food product to pass through the openings and to create space between individual pieces of the frozen food product.

16. The process as recited in claim 15, wherein the sorting belt is traveling at a speed between 4 m/m and 10 m/m.

17. The process as recited in claim 1, wherein the pieces of completely enrobed frozen food product are flash frozen in an Individual Quick Frozen (IQF) unit at a temperature below −18° C., wherein the IQF unit comprises a perforated belt having frozen air blowing up through the perforated belt, and causing the pieces of completely enrobed frozen food product to lift off the perforated belt and separate from other pieces of completely enrobed frozen food product.

18. A process of applying untempered chocolate onto pieces of frozen food product to form a thin layer of a chocolate coating and prevent condensation from forming on the chocolate coating, the process comprising:
providing pieces of frozen food product onto a sorting belt that is traveling at a speed between 4 m/m and 10 m/m, wherein the sorting belt comprises wire mesh with openings that are large enough to allow small pieces of the frozen food product to pass through the openings and to create space between individual pieces of the frozen food product;

applying a layer of the chocolate coating by conveying the pieces of the frozen food product along an enrobing belt under a curtain of the chocolate coating, wherein the chocolate coating comprises (i) untempered chocolate containing cocoa butter, no more than about 0.6% coconut oil by weight, and no butter, and (ii) a plurality of coconut inclusions, and wherein the chocolate coating is maintained at a temperature between about 37.8° C. and about 43.3° C. and the enrobing belt travels at a speed of between about 5 m/m and about 15 m/m, to envelop each pieces of the frozen food product in the chocolate coating thereby creating pieces of completely enrobed frozen food product;

conveying the pieces of completely enrobed frozen food product along a vibrating perforated belt having pressurized air passing up through the belt to remove all the chocolate coating in excess of a thin layer between about 1 mm and about 2 mm thick;

cooling the pieces of completely enrobed frozen food product to a temperature between about 1.7° C. and about 7.2° C., by conveying the pieces of completely enrobed frozen food product along a cooling belt, traveling at a speed between about 6 m/m and about 10 m/m, to harden the chocolate coating along a bottom surface of each piece of the completely enrobed frozen food product;

flash cooling the pieces of completely enrobed frozen food product in a rapid cooling tunnel at a temperature below 1.7° C.;

flash freezing the pieces of completely enrobed frozen food product in an Individual Quick Frozen (IQF) unit at a temperature below −18° C., wherein the IQF unit comprises a perforated belt having frozen air blowing up through the perforated belt, and causing the pieces of completely enrobed frozen food product to lift off the perforated belt and separate from other pieces of completely enrobed frozen food product; and rapidly packaging the flash frozen pieces of completely enrobed frozen food product at a temperature between about 0° C. and about 10° C. to prevent condensation from forming on the pieces of completely enrobed frozen food product.

* * * * *